(12) United States Patent
Johnston et al.

(10) Patent No.: US 7,840,660 B1
(45) Date of Patent: Nov. 23, 2010

(54) SYSTEM, METHOD, AND COMPUTER PROGRAM PRODUCT FOR DETERMINING WHETHER A PROCESS IDENTIFIED UTILIZING A FIRST PROXY IS ASSOCIATED WITH AN ADDITIONAL PROXY

(75) Inventors: Brent A. Johnston, Waterloo (CA); Justin A. Mathews, Waterloo (CA); Mykhaylo Melnyk, Kitchener (CA)

(73) Assignee: McAfee, Inc., Santa Clara, CA (US)

( * ) Notice: Subject to any disclaimer, the term of this patent is extended or adjusted under 35 U.S.C. 154(b) by 295 days.

(21) Appl. No.: 11/847,175

(22) Filed: Aug. 29, 2007

(51) Int. Cl.
*G06F 15/16* (2006.01)
*G06F 15/173* (2006.01)
*H04L 12/56* (2006.01)
*H04L 12/28* (2006.01)
*H04L 29/06* (2006.01)

(52) U.S. Cl. .................. 709/223; 709/203; 709/224; 709/227; 709/229; 370/390; 370/392; 713/153

(58) Field of Classification Search .............. None
See application file for complete search history.

(56) References Cited

U.S. PATENT DOCUMENTS

| | | | | |
|---|---|---|---|---|
| 2004/0243703 | A1* | 12/2004 | Demmer et al. | 709/224 |
| 2005/0108320 | A1* | 5/2005 | Lord et al. | 709/201 |
| 2008/0091812 | A1* | 4/2008 | Lev-Ran et al. | 709/223 |

\* cited by examiner

*Primary Examiner*—Ario Etienne
*Assistant Examiner*—Ho Shiu
(74) *Attorney, Agent, or Firm*—Zilka-Kotab, PC (57) ABSTRACT

A method, system, and computer program product are provided for determining whether a process identified utilizing a first proxy is associated with an additional proxy. In use, a process is identified, utilizing the first proxy. Further, it is determined whether the process is associated with the additional proxy. In addition, an action is conditionally performed based on the determination.

19 Claims, 7 Drawing Sheets

SYSTEM, METHOD, AND COMPUTER PROGRAM PRODUCT FOR DETERMINING WHETHER A PROCESS IDENTIFIED UTILIZING A FIRST PROXY IS ASSOCIATED WITH AN ADDITIONAL PROXY

FIELD OF THE INVENTION

The present invention relates to proxies, and more particularly detecting proxies.

BACKGROUND

Traditionally, proxies are used to cache data, inspect data, etc. In addition, a proxy model generally redirects network connection requests to a local port where a proxy service is listening, thereby allowing the proxies to be transparent to applications associated with such network connection requests. For example, in the case of an outgoing network connection, a proxy generally receives a network connection request and directs the network connection request to a remote host. However, sometimes multiple proxies may be utilized (e.g. with respect to different services, etc.) in combination, which has generally exhibited various limitations. For example, when multiple proxies are used, the proxies may continually proxy each other's connections, thus resulting in a loss of network connectivity.

There is thus a need for addressing these and/or other issues associated with the prior art.

SUMMARY

A method, system, and computer program product are provided for determining whether a process identified utilizing a first proxy is associated with an additional proxy. In use, a process is identified, utilizing the first proxy. Further, it is determined whether the process is associated with the additional proxy. In addition, an action is conditionally performed based on the determination.

DETAILED DESCRIPTION

Figure 1:
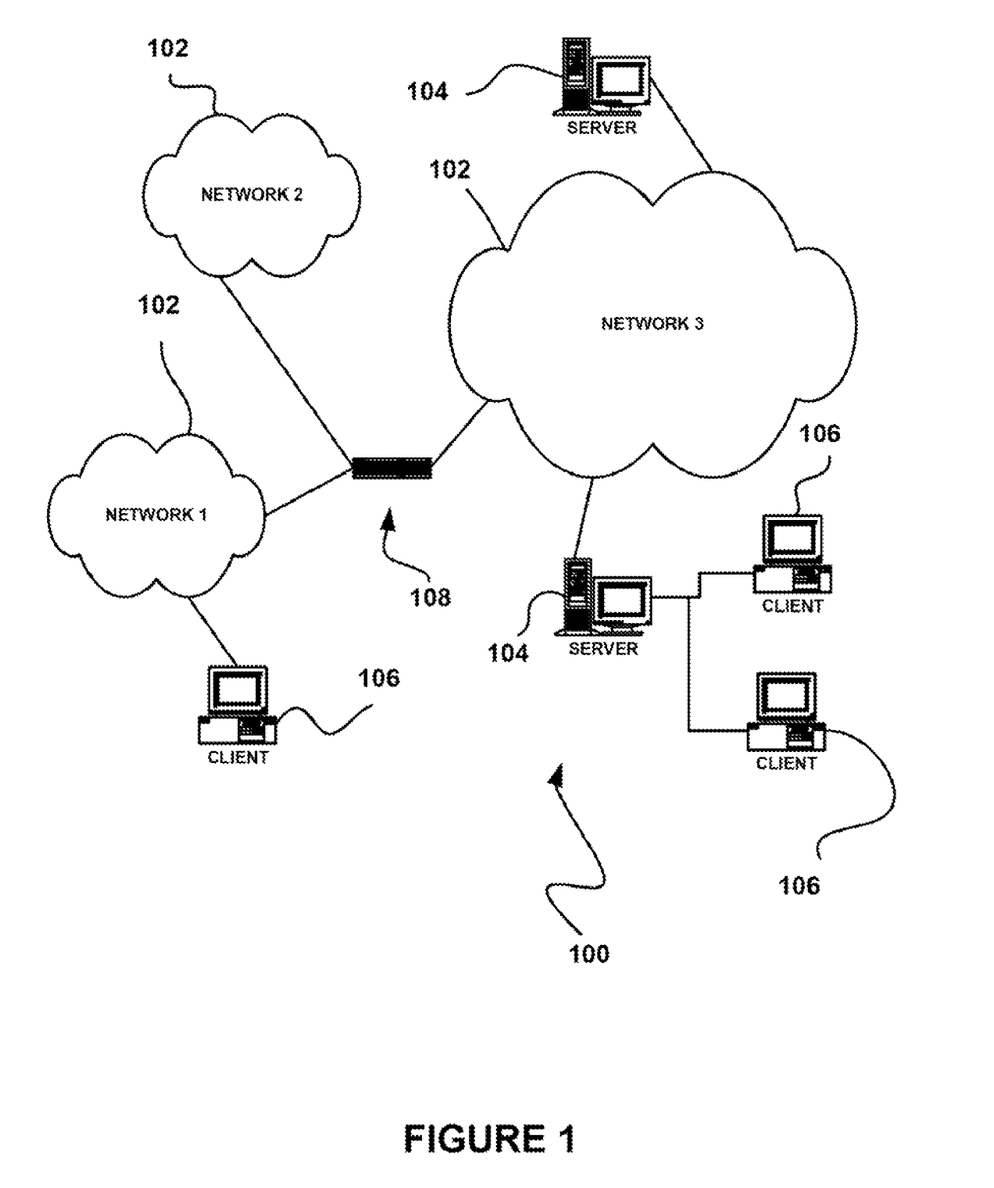
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and or any other type of logic. In order to facilitate communication among the networks 102, at least one gateway 108 is optionally coupled therebetween.

Figure 2:
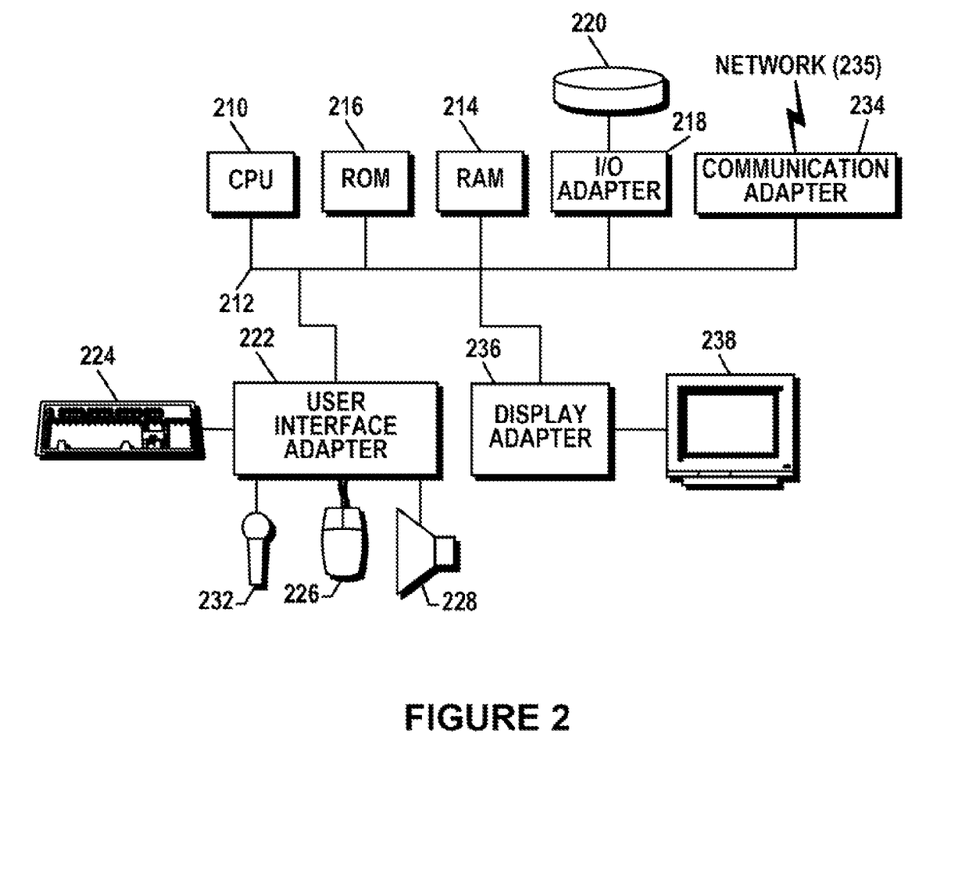
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
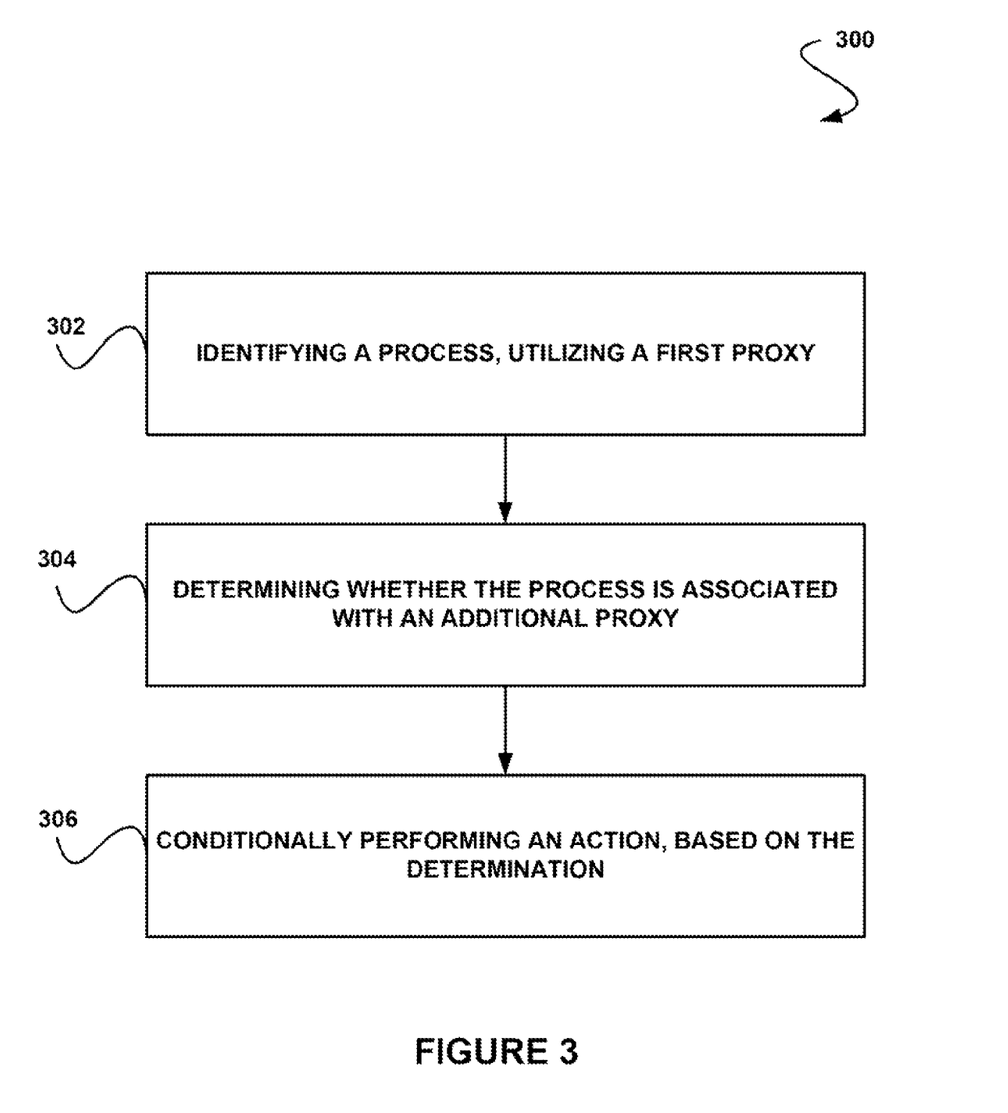
FIG. 3 shows a method for performing an action based on a determination of whether a process is associated with an additional proxy, in accordance with one embodiment.

FIG. 3 shows a method 300 for performing an action based on a determination of whether a process is associated with an additional proxy, in accordance with one embodiment. As an option, the method 300 may be carried out in the context of the architecture and environment of FIGS. 1 and/or 2. Of course, however, the method 300 may be carried out in any desired environment.

As shown in operation 302, a process is identified, utilizing a first proxy. In the context of the present description, the process may include any executing function, routine, etc. capable of being identified utilizing the first proxy. In one embodiment, the process may be associated with an application. For example, the application may be a driver, an additional proxy, an operating system, a network capable application, etc. Furthermore, in another embodiment, the process may execute instructions associated with the application. In yet another embodiment, the process may be executed by a central processing unit (e.g. such as the central processing unit 210 of FIG. 2, etc).

Further, the first proxy may be any device, application, etc. capable of servicing requests. For example, the first proxy may include a proxy server. In one embodiment, the first proxy may provide a connection from a client to a server. For example, the connection may be associated with the process. In various embodiments, the connection may include a network request, a network response, or any attempt to create, establish, or utilize a link associated with the network. For example, the connection may be between the client and the server, the client and another client, the server and another server, etc.

In yet another embodiment, the connection from the client to the server may be redirected through the first proxy. As an option, the first proxy may be utilized to forward the connection from the client to the server. As another option, the first proxy may be utilized to filter the connection from the client to the server. In still yet another embodiment, the first proxy may reside on the client, or on another device capable of receiving a connection (e.g. from the client, etc.).

Still yet, in another embodiment, the first proxy may be a transparent proxy. For example, the transparent proxy may redirect a connection from the client to the server without a specific proxy configuration on the client. To this end, the transparent proxy may redirect all client connections to the proxy without a client application, driver, etc % being configured to specifically utilize the proxy. As another example, the first proxy may be transparent such that a request and/or response may be not necessarily be modified beyond an authentication and/or identification utilized by the first proxy.

In one embodiment, the first proxy may redirect connections to a specific port or plurality of ports on the client and/or the server. As an option, the ports may include standard ports. For example, the standard ports may include a Hypertext Transfer Protocol (HTTP) port, a File Transfer Protocol (FTP) port, a Simple Mail Transfer Protocol (SMTP) port, an Internet Message Access Protocol (IMAP) port, a Post Office Protocol version 3 (POP3) port, etc.

Moreover, the process may be identified utilizing the first proxy in any desired manner. In one embodiment, the process may be identified based on a connection to a destination (e.g. port, internet protocol address and port, etc.). For example, the first proxy may make the connection to the destination. To this end, in one exemplary embodiment, an application of the client may utilize the process for issuing a request to the server, such that the first proxy may identify the process when directing such request to the server.

Additionally, as shown in operation 304, it is determined whether the process is associated with an additional proxy. In the context of the present embodiment, the additional proxy may include any additional proxy that performs a proxy service that is separate from the service of the first proxy. For example, the additional proxy may be associated with the client. In another embodiment, the additional proxy may be utilized to proxy a connection of the first proxy or another application associated with the client. In one embodiment, the determination of whether the process is associated with the additional proxy may be made utilizing a redirector.

Further, in one embodiment, the first proxy may initialize the redirector. Still yet, in another embodiment, the initialization of the redirector may include installing the redirector. Additionally, installing the redirector may include installing a driver, registering a driver, configuring the redirector, instantiating the redirector, hooking the redirector into an operating system, etc. In one embodiment, the redirector may be associated with and/or coupled to the first proxy. As an option, the first proxy may include the redirector.

Thus, the redirector may optionally be capable of determining if the process is associated with the additional proxy. For example, the redirector of the first proxy may be utilized to identify the process (operation 302). In one embodiment, the redirector may identify a name of the process and a destination associated with the process. As an option, such destination may include an internet protocol (IP) address and a port. Moreover, the port may include standard port.

In one embodiment, determining whether the process is associated with the additional proxy may include determining whether the process is proxied or will be proxied by the additional proxy. Still yet, in another embodiment, it may be determined whether the process is associated with the additional proxy by creating a connection to a destination. As an option, the connection may be made to a particular IP address and/or port. In one embodiment, the IP address and/or the port may be predetermined. In another embodiment, the first proxy may determine the IP address and/or the port. For example, an IP address and/or port may be randomly determined.

In yet another embodiment, the determination may be performed during the initialization of the redirector. For example, during initialization of the redirector, the redirector may create a connection to a destination, determine if a different process has connected to the destination, and identify the process as an additional proxy. To this end, it may be determined whether the process is associated with the additional proxy.

Furthermore, as shown in operation 306, an action is conditionally performed based on the determination. In one embodiment, the first proxy may perform the action based on a determination that the process is not associated with an additional proxy. As an option, the action may be based on a set of rules. Further, the rules may be user defined.

In one embodiment, the action may include proxying a connection associated with the process, utilizing the first proxy. To this end, the rules may be utilized to determine whether the first proxy will proxy a connection associated with the process. For example, if it is determined that the process is associated with the additional proxy, the first proxy may not necessarily proxy the connection associated with the process.

In yet another example, if it is determined that the process is not associated with the additional proxy, the first proxy may proxy the connection associated with the process. Of course, it should be noted that the action may include any action capable of being performed based on the determination of whether the process is associated with the additional proxy. Accordingly, multiple proxies may be prevented from proxying a single connection associated with a process, such that connectivity for such process may be maintained.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
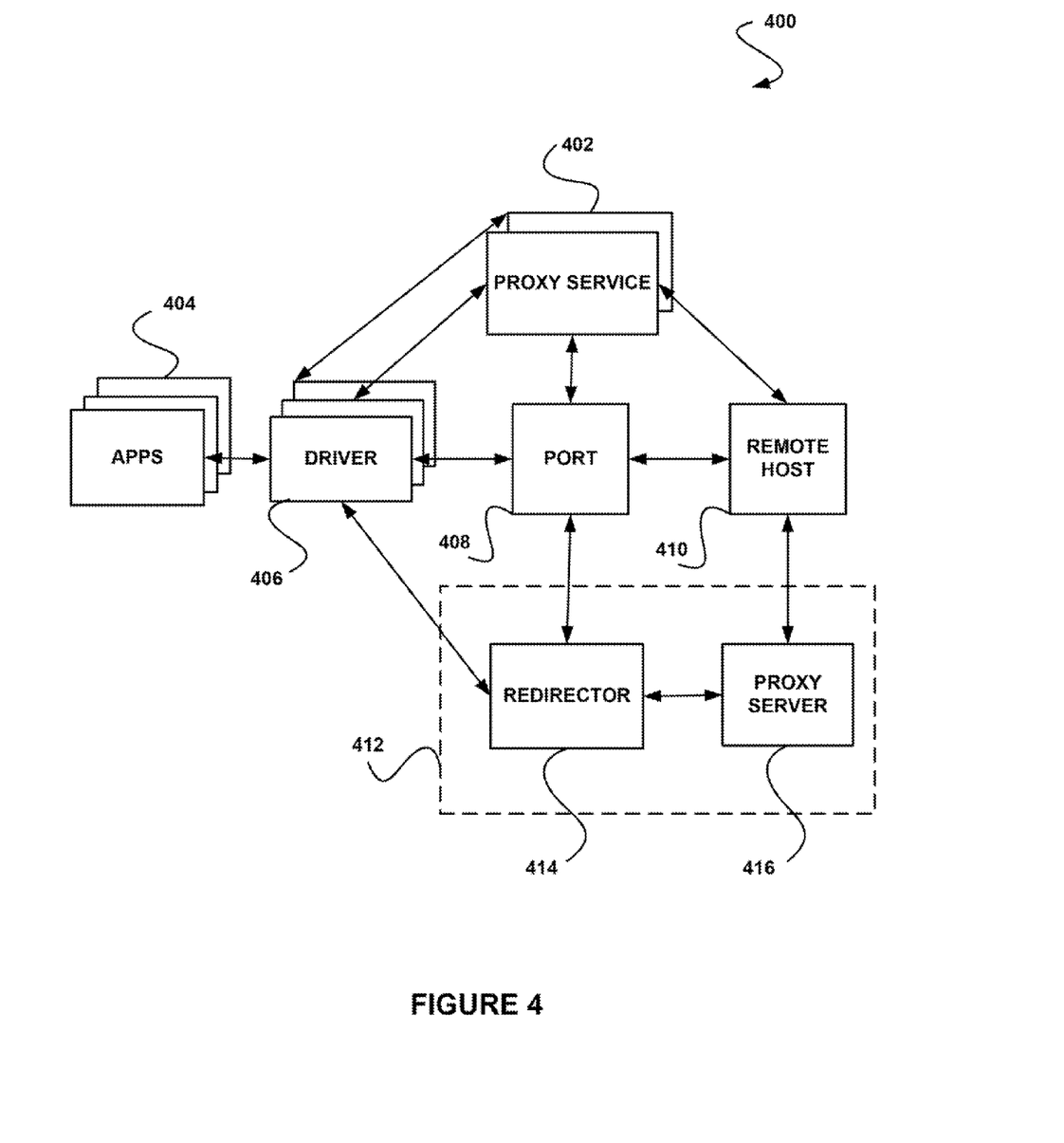
FIG. 4 shows a system for determining whether a process is associated with an additional proxy, in accordance with another embodiment.

FIG. 4 shows a system 400 for determining whether a process is associated with an additional proxy, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, the system 400 may include applications 404 which are in communication with a plurality of drivers 406. For example, the applications 404 may each include any application capable of directly or indirectly communicating with at least one of the drivers 406, such as for example, a web browser, an electronic mail application, an instant messaging application, etc. As an option, the drivers 406 may each provide an interface to (e.g. be in communication with, etc.) a first proxy service 412, a second proxy service 402, an operating system, a server, a client, a port 408, etc. In one embodiment, the drivers 406 may each redirect outgoing connections associated with processes of the applications 404 through the port 408. As an option, the port 408 may be a local port.

Still yet, in another embodiment, the drivers 406 may be in communication with one another. For example, such drivers 406 may include proxy drivers, network drivers, etc. In one embodiment, the applications 404 may communicate with one of the drivers 406 that was first installed. Further, in yet another embodiment, each of the applications 404 may communicate with one of the drivers 406 that is configured to communicate therewith. Still yet, in one embodiment, the drivers 406 may pass a connection between one another.

As also shown, a redirector 414 is associated with (e.g. coupled to, integrated with, etc) the first proxy service 412. Just by way of example, the redirector may include the redirector described above with respect to operation 304 of FIG. 3. Of course, other embodiments are contemplated where the redirector 414 is a separate component.

As an option, the drivers 406 may initialize the redirector 414. As another option, the first proxy service 412 may initialize the redirector 414. Furthermore, in yet another embodiment, the redirector 414 may be initialized by one of the drivers 406 when the driver 406 is registered. As an option, such driver 406 may be registered when the driver 406 is installed.

in use, the redirector 414 may determine if a number of different processes are associated with the second proxy 402 by creating a connection to a destination. For example, the redirector 414 may identify a number of different processes that have connected to the destination (e.g. with a predefined time period, etc.). Optionally, the redirector 414 may count the number of different processes identified as having connected to the destination. Additionally, the redirector 414 may identify at least one process that has connected to the destination that is associated with the additional proxy 402.

Further, in another embodiment, the applications 404 may request a connection to a remote host 410 utilizing a driver 406. The remote host 410 may include any device to which the applications are capable of connecting. For example, the remote host 410 may include a content server, etc. To this end, a driver 406 associated with the first proxy service 412 may utilize the redirector 414 to determine if a process associated with the connection is associated with one of the applications 404.

Still yet, in another embodiment, if the redirector 414 determines that the process is associated with one of the applications 404, the driver 406 associated with the first proxy service 412 may rewrite information associated with the connection in order to provide the connection to the destination via the proxy server 416 of the first proxy service 412. Furthermore, if the redirector 414 determines that the process is not associated with one of the applications 404, the driver 406 associated with the first proxy service 412 may skip the rewrite of information associated with the connection. Thus, the proxy server 416 may be prevented from proxying the connection. For example, determining that the process is not associated with one of the applications 404 may indicate that that the process is associated with the second proxy service 402.

In operation, the driver 406 associated with the first proxy service 412 may send the connection to a next one of the drivers 406. In yet another embodiment, the driver 406 associated with the second proxy service 402 may rewrite information associated with the connection. For example, the information associated with the connection may include the source address, destination address, source port, destination port, etc.

Further, in one embodiment, the connection may be communicated between the drivers 406, until reaching a last one of the drivers 406. As an option, the last one of the drivers 406 may be a network driver associated with an operating system. For example, the network driver may be utilized to communicate the connection to the destination by sending the connection through all of the drivers 406 to a first one of the drivers 406.

In addition, the driver 406 associated with the first proxy service 412 may send the connection to the first proxy service 412, which may process the connection, and further send the connection to the local port 408. Further, in one embodiment, the driver 406 associated with the first proxy service 412 may send the connection from the local port 408 to a last one of the drivers 406. For example, the driver 406 associated with the second proxy service 402 may be utilized to communicate the connection to the destination by sending the connection to the first one of the drivers 406. Furthermore, the first one of the drivers 406 may then send the connection to second proxy service 402, which may process the connection, and further send the connection to the local port 408.

In another embodiment, the driver 406 associated with the first proxy service 412 may utilize the redirector 414 to determine if the process associated with the connection is associated with the second proxy service 402. Further, if the redirector 414 determines that the process is associated with the second proxy service 402, the driver 406 associated with the first proxy service 412 may skip the rewrite of information associated with the connection. Further, the connection may be communicated to the last one of the drivers 406. Additionally, the last one of the drivers 406 may then connect to the remote host 410.

Figure 5:
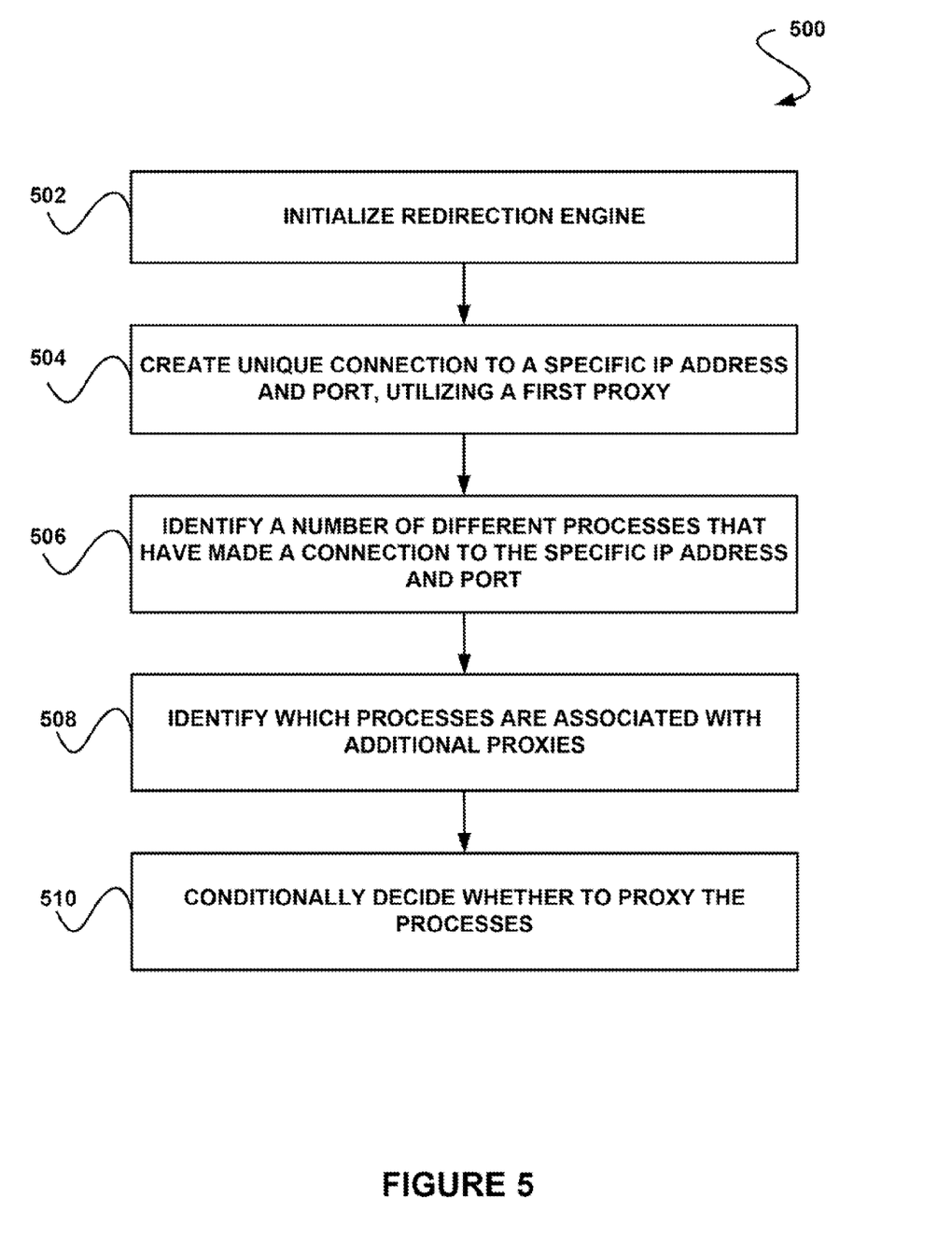
FIG. 5 shows a method for determining whether to proxy a process, in accordance with yet another embodiment.

FIG. 5 shows a method 500 for determining whether to proxy a connection associated with a process, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 502, a redirection engine (e.g. redirector 414 of FIG. 4) is initialized. For example, the redirection engine may be initialized by installing a driver (e.g. driver 406 of FIG. 4), registering the driver, configuring the driver, configuring the redirection engine, instantiating the redirection engine, etc. In one embodiment, the redirection engine may initialize automatically when an associated client initializes. In another embodiment, the redirection engine may initialize automatically after a first connection is communicated via such redirection engine. 4.

In addition, a unique connection to a specific IP address and port is created utilizing a first proxy, as shown in operation 504. In one embodiment, the specific IP address and port may be randomly chosen. In another embodiment, the specific IP address and port may be preconfigured. As an option, the specific port may be chosen from a list of standard ports. For example, the first proxy may select a port such as a HTTP port, an IMAP port, a POP3 port, a SMTP port, etc.

Still yet, in another embodiment, the first proxy may create the unique connection after the initialization of the redirection engine. For example, after the redirection engine initializes, the first proxy may make the unique connection to the specific IP address and port. Of course, the first proxy may also create the unique connection before or during the initialization of the redirection engine.

As shown in operation 506, a number of different processes that have made a connection to the specific IP address and port are identified. For example, when the first proxy creates the unique connection, a driver may receive the connection request and forward the connection request to another proxy that is different than the first proxy. Furthermore, a connection request from the other proxy may be forwarded to a driver in communication with the redirector. The redirector may thus be utilized to identify the number of other processes making a connection to the specific IP address and port, in one exemplary embodiment.

In addition, as shown in operation 508, processes which are associated with additional proxies are identified. In one embodiment, the redirector may identify such processes that make the connection to the specific IP address and port, as described above. As an option, the redirector may identify a name of the processes that make the connection to the specific IP address and port. Further, the redirector may determine whether any of such process is associated with additional proxies that are different than the first proxy. In one embodiment, such determination may be based on the number of different processes that made a connection to the specific IP address and port.

In another embodiment, the first proxy may create several unique connections to the specific IP address utilizing a plurality of ports selected from the list of standard service ports. For example, the first proxy may create a unique connection to an IP address utilizing an IMAP port, another a unique connection utilizing a SMTP port, etc. As an option, a different IP address may be utilized for each unique connection. To this end, it may be determined whether additional proxies are associated with the plurality of ports.

Further, it is conditionally decided whether to proxy the process, as shown in decision 510. In one embodiment, if it is determined that any of the processes are associated with an additional proxy, the first proxy may not necessarily proxy a connection associated with such processes. In yet another embodiment, if it is determined that any of the processes are not associated with an additional proxy, the first proxy may proxy a connection associated with such processes.

Still yet, as an option, an order of proxy filtration performed by the first proxy and any additional proxies may be determined. In one embodiment, the order of proxy filtration may be determined by examining a calling order of proxy connections. For example, if the redirector determines that the additional proxy is called prior to the first proxy, then the additional proxy may be utilized before the first proxy in the order of proxy filtration.

Figure 6:
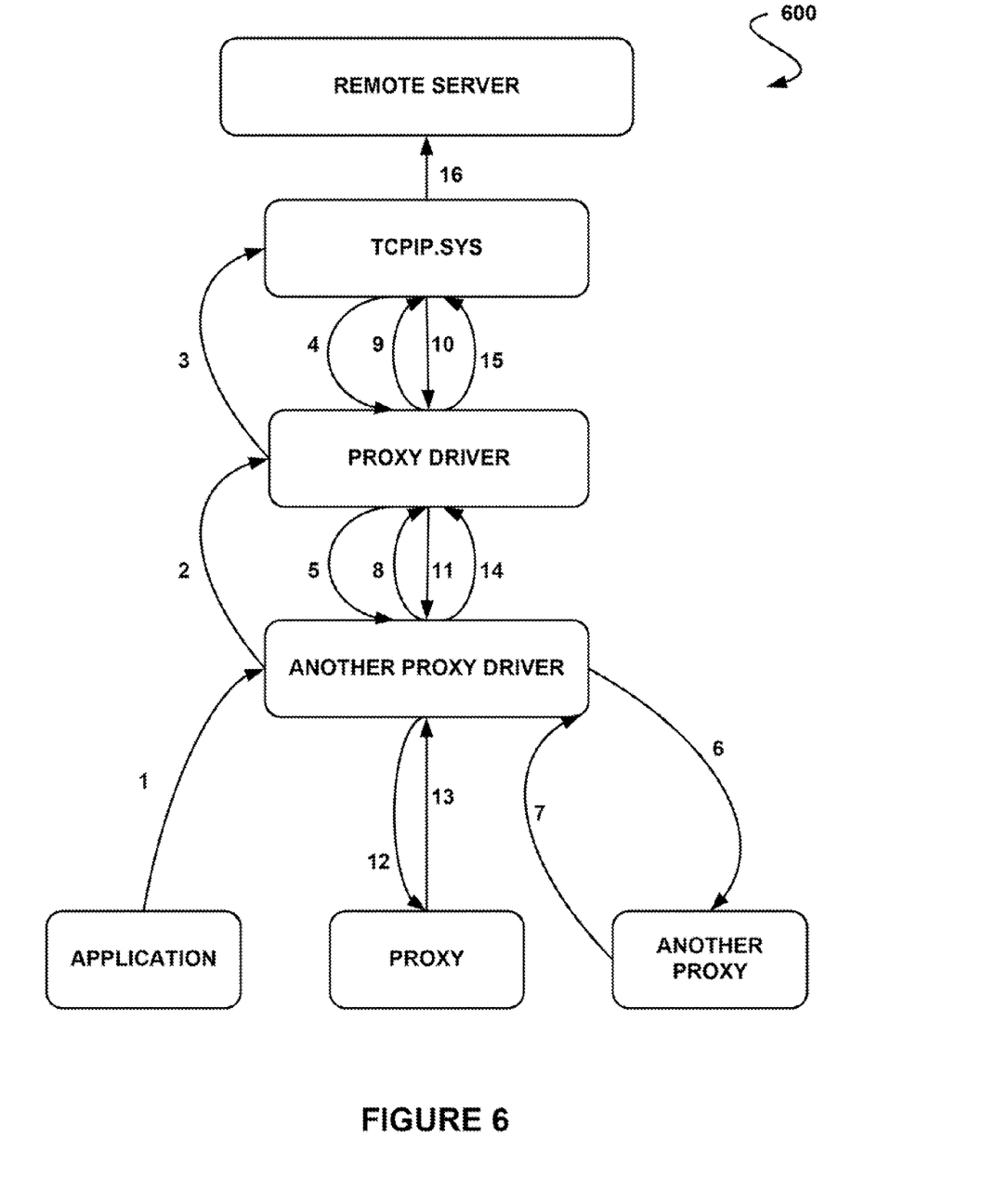
FIG. 6 shows a method for connecting to a remote server utilizing multiple proxies, in accordance with still yet another embodiment.

FIG. 6 shows a method 600 for connecting to a remote server utilizing multiple proxies, in accordance with still yet another embodiment. As an option, the method 600 may be carried out in the context of the architecture and environment of FIGS. 1-5. Of course, however, the method 600 may be carried out in any desired environment. Again, it should also be noted that the aforementioned definitions may apply during the present description.

As shown, an application connects to another proxy driver. See step 1. As an option, the application may connect to a port associated with the other proxy driver. In the context of the present embodiment, the other proxy driver may be the first driver in a chain of drivers. For example, the chain of drivers may include a plurality of proxy drivers and/or a network driver associated with an operating system. In addition, the other proxy driver may rewrite information associated with the connection. For example, the other proxy driver may rewrite the destination of the connection to the address of another proxy (as shown with respect to step 6).

As also shown, the other proxy driver sends the connection to the next driver down the chain of drivers. See step 2. For example, the next driver down the chain of drivers may be a proxy driver (as shown). In another embodiment, the proxy driver may utilize a redirector of a proxy (as shown) to determine if the connection is from a process associated with an application. As an option, if it is determined that the connection is not from a process associated with the other proxy, the proxy driver may rewrite the connection information. In another option, if it is determined that the connection is from a process associated with the other proxy, the proxy driver may not rewrite the connection information. For example, if a previous connection was not from a process that is associated with the other proxy, the proxy driver may rewrite the connection information.

Furthermore, the proxy driver sends the connection to the next driver down the chain of drivers. See step 3. As an option, the next driver down the chain of drivers may be the network driver. As an option, the network driver may be associated with the operating system. As an example, the network driver may include tcpip.sys. Still yet, in another embodiment, the network driver may send the connection to the destination, which, as shown, may include a remote server. Further, if the proxy driver rewrites the destination to the proxy, as described above, the network driver sends the connection up the chain of drivers to the proxy driver. See step 4. In addition, the proxy driver sends the connection up the chain of drivers to the other proxy driver, as shown in step 5.

Additionally, the other proxy driver sends the connection to the other proxy. See step 6. Further, the other proxy connects to the other proxy driver. See step 7. As an option, the other proxy may connect to a port associated with the other proxy driver. Furthermore, the other proxy driver then sends the connection to the next driver down the chain of drivers. See step 8.

Still yet, in one embodiment, the proxy driver may utilize the redirector of the proxy to determine if the connection is from a process associated with the other proxy. As an option, if it is determined that the connection is not from a process associated with the other proxy, the proxy driver may rewrite the connection information. In another option, if it is determined that the connection is from a process associated with the other proxy, the proxy driver may not rewrite the connection information.

In addition, the proxy driver sends the connection to the next driver down the chain of drivers towards the network driver. See step 9. Still yet, the network driver sends the connection back up the chain of drivers to the proxy driver for ultimately delivering such connection to the proxy. See step 10. Further, the proxy driver sends the connection up the chain of drivers to the other proxy driver, as shown in step 11.

Moreover, the other proxy driver sends the connection to the proxy. See step 12. Additionally, the proxy connects to the other proxy driver. See step 13. As an option, the proxy may connect to a port associated with the other proxy driver. In addition, the other proxy driver sends the connection to the proxy driver. See step 14. Further, the proxy sends the connection down the chain of drivers towards the network driver. See step 15. Additionally, the network driver sends the connection to the remote server. See step 16.

Figure 7:
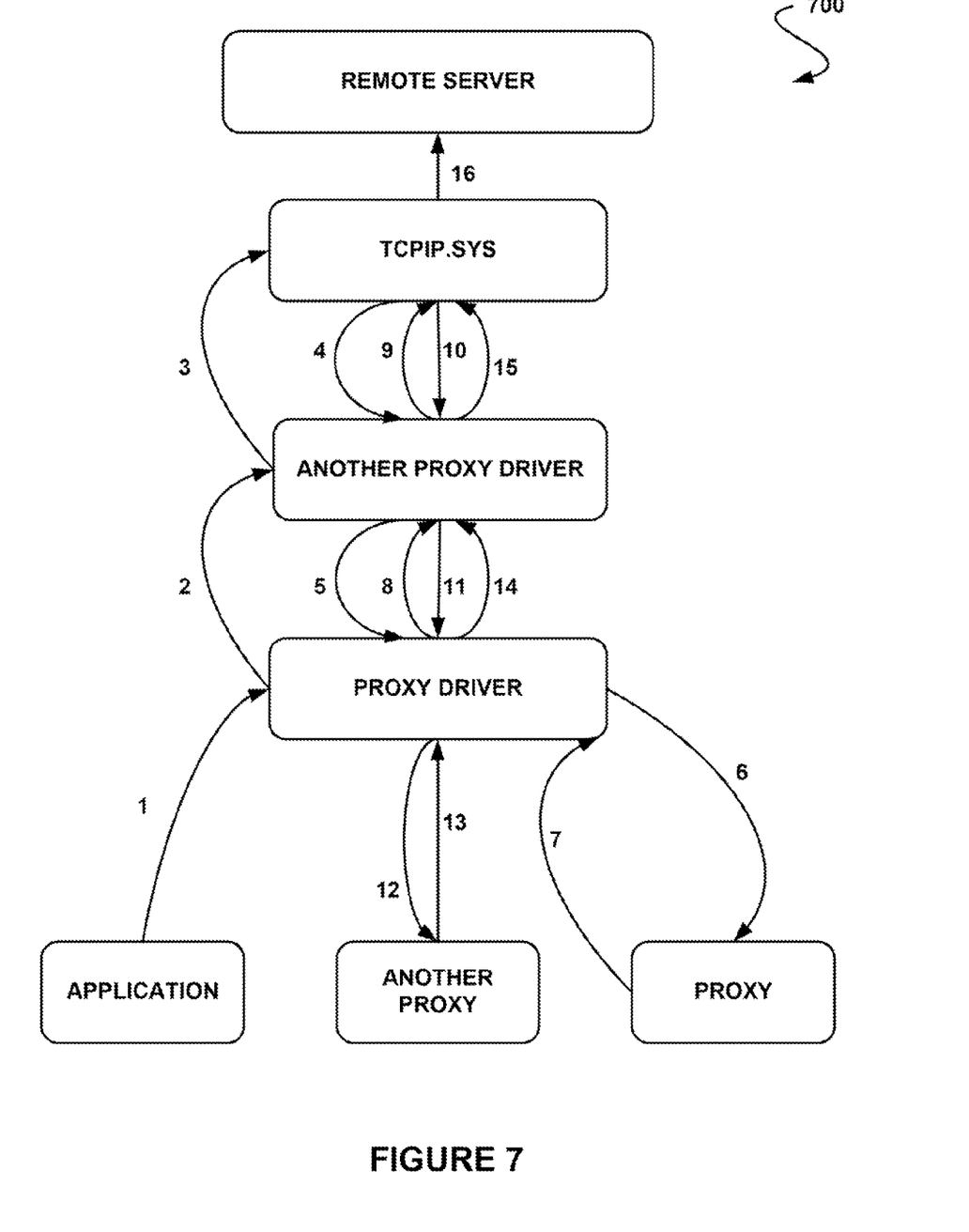
FIG. 7 shows a method for connecting to a remote server utilizing multiple proxies, in accordance with another embodiment.

FIG. 7 shows a method 700 for connecting to a remote server utilizing multiple proxies, in accordance with one embodiment. As an option, the method 700 may be carried out in the context of the architecture and environment of FIGS. 1-6. Of course, however, the method 700 may be carried out in any desired environment. Again, it should also be noted that the aforementioned definitions may apply during the present description.

As shown, an application connects to a proxy driver. See step 1. As an option, the application may connect to a port associated with the proxy driver. In the context of the present embodiment, the proxy driver may be the first driver in a chain of drivers. For example, the chain of drivers may include a plurality of proxy drivers and/or a network driver associated with an operating system. In another embodiment, the proxy driver may utilize a redirector of a proxy to determine if the connection is from an application. As an option, if it is determined that the connection is not from a process associated with another proxy, the proxy driver may rewrite the connection information. In another option, if it is determined that the connection is from a process associated with the other proxy, the proxy driver may skip rewriting the connection information.

In another embodiment, the proxy driver sends the connection to the next driver down the chain of drivers. See step 2. For example, the next driver down the chain of drivers may be another proxy driver, in addition, the other proxy driver may rewrite the connection information. For example, the other proxy driver may rewrite the destination of the connection to the address of the other proxy.

Furthermore, the other proxy driver sends the connection to the next driver down the chain of drivers towards the network driver. See step 3. As an option, the next driver down the chain of drivers may be a network driver. As yet another option, the network driver may be associated with the operating system. As an example, the network driver may include tcpip.sys. Still yet, in another embodiment, the network driver may try to send the connection to the destination. Further, if the other proxy rewrites the destination to the other proxy address, the network driver sends the connection up the chain of drivers to the other proxy driver. See step 4. In addition, the other proxy driver sends the connection up the chain of drivers to the proxy driver, as shown in step 5.

Additionally, the proxy driver sends the connection to the proxy. See step 6. Further, the proxy connects to the proxy driver. See step 7. As an option, the proxy may connect to a port associated with the proxy driver. Furthermore, the proxy driver then sends the connection to the next driver down the chain of drivers. See step 8. In addition, the other proxy driver sends the connection to the next driver down the chain of drivers towards the network driver. See step 9. Still yet, the network driver sends the connection back up the chain of drivers to the other proxy driver for delivery to the other proxy. See step 10. Further, the other proxy driver sends the connection up the chain of drivers to the proxy driver, as shown in step 11.

Moreover, the proxy driver sends the connection to the other proxy. See step 12. Additionally, the other proxy connects to the proxy driver. See step 13. As an option, the other proxy connects to a port associated with the proxy driver. Still yet, in one embodiment, the proxy driver may utilize the redirector of the proxy to determine if the connection is from a process associated with the other proxy. As an option, if it is determined that the connection is not from a process associated with the other proxy, the proxy driver may rewrite the connection information. In another option, if it is determined that the connection is from a process associated with the other proxy, the proxy driver may not rewrite the connection information.

In addition, the proxy driver sends the connection to the other proxy driver. See step 14. Further, the other proxy sends the connection to the next driver down the chain of drivers towards the network driver. See step 15. Additionally, the network driver sends the connection to the remote server. See step 16.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising: identifying a process, utilizing a first proxy; determining whether the process is associated with an additional proxy; and conditionally performing an action, based on the determination, utilizing a processor;
   wherein the action includes at least one of not proxying a connection associated with the additional proxy if it is determined that the process is associated with the additional proxy and proxying a connection associated with the process if it is determined that the process is not associated with the additional proxy; and,
   wherein the connection associated with the additional proxy is also associated with the process, and the action includes not proxying the connection associated with the additional proxy if it is determined that the process is associated with the additional proxy for avoiding multiple proxies from proxying the connection associated with the additional proxy and the process, such that connectivity for the process is maintained.

2. The method of claim 1, wherein the process is associated with an application.

3. The method of claim 2, wherein the application is at least one of an additional proxy application and a network capable application.

4. The method of claim 1, wherein the first proxy is utilized to forward a connection from a client to a server.

5. The method of claim 1, wherein the process is identified utilizing a redirector of the first proxy.

6. The method of claim 5, further comprising initializing the redirector of the first proxy.

7. The method of claim 6, wherein the initializing includes installing the redirector.

8. The method of claim 1, wherein the process is identified based on a connection to a destination.

9. The method of claim 8, wherein the connection is created utilizing the first proxy.

10. The method of claim 8, wherein the destination includes a port.

11. The method of claim 10, wherein the port includes a standard service port.

12. The method of claim 11, wherein the standard service port includes one of a Hypertext Transfer Protocol (HTTP) port, a File Transfer Protocol (FTP) port, a Simple Mail Transfer Protocol (SMTP) port, an Internet Message Access Protocol (IMAP) port, and a Post Office Protocol version 3 (POP3) port.

13. The method of claim 8, wherein the destination includes an internet protocol address and a port.

14. The method of claim 8, wherein a number of different processes that are connected to the destination is identified.

15. The method of claim 14, wherein it is determined whether any of the different processes are associated with the additional proxy.

16. The method of claim 1, wherein the process is utilized for issuing a request from a client to a server, and the process is identified when directing the request to the server by identifying a name of the process and a destination associated with the process.

17. A computer program product embodied on a non-transitory computer readable storage medium, comprising:
  computer code for identifying a process, utilizing a first proxy;
computer code for determining whether the process is associated with an additional proxy; and
  computer code for conditionally performing an action, based on the determination;
  wherein the computer program product is operable such that the action includes at least one of not proxying a connection associated with the additional proxy if it is determined that the process is associated with the additional proxy and proxying a connection associated with the process if it is determined that the process is not associated with the additional proxy;
  wherein the connection associated with the additional proxy is also associated with the process, and the action includes not proxying the connection associated with the additional proxy if it is determined that the process is associated with the additional proxy for avoiding multiple proxies from proxying the connection associated with the additional proxy and the process, such that connectivity for the process is maintained.

18. A system, comprising:
a processor for identifying a process utilizing a first proxy, determining whether the process is associated with an additional proxy, and conditionally performing an action based on the determination;
  wherein the system is operable such that the action includes at least one of not proxying a connection associated with the additional proxy if it is determined that the process is associated with the additional proxy and proxying a connection associated with the process if it is determined that the process is not associated with the additional proxy;
  wherein the connection associated with the additional proxy is also associated with the process, and the action includes not proxying the connection associated with the additional proxy if it is determined that the process is associated with the additional proxy for avoiding multiple proxies from proxying the connection associated with the additional proxy and the process, such that connectivity for the process is maintained.

19. The system of claim 18, wherein the processor is coupled to memory via a bus.

* * * * *